(12) United States Patent
Lehman

(10) Patent No.: US 6,658,437 B1
(45) Date of Patent: Dec. 2, 2003

(54) SYSTEM AND METHOD FOR DATA SPACE ALLOCATION USING OPTIMIZED BIT REPRESENTATION

(75) Inventor: Tobin J. Lehman, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 528 days.

(21) Appl. No.: 09/586,848

(22) Filed: Jun. 5, 2000

(51) Int. Cl.[7] .............................................. G06F 12/00
(52) U.S. Cl. .......................... 707/205; 707/2; 711/112; 711/145; 711/154; 711/156; 711/170; 711/211
(58) Field of Search ...................... 707/205, 2; 711/112, 711/170, 211, 145, 154, 156

(56) References Cited

U.S. PATENT DOCUMENTS 5,490,274 A * 2/1996 Zbikowski et al. .......... 711/112
5,732,402 A * 3/1998 Lehman ....................... 707/205

OTHER PUBLICATIONS

Publication: "The Starburst Long Field Manager" Report RJ–6899. pps. 1–14. IBM Almaden Research Center. San Jose, CA. Published Jun. 1989.

* cited by examiner

*Primary Examiner*—Kim Vu
*Assistant Examiner*—Hung Pham
(74) *Attorney, Agent, or Firm*—John L. Rogitz

(57) ABSTRACT

A database management system that stores and retrieves large data objects (LOBs) from a database storage of a computer system storage device containing a LOB data space having LOB data values of a database. The space management system permits a user of the computer system to generate requests for access to LOBs of a database and includes a plurality of allocation units for storing data. Each allocation unit has an address, and the allocation units are grouped into a plurality of blocks, each block including at least two allocation units. The space management system includes first and second types of space allocation maps. Each of these two types of space allocation maps has a predetermined number of bits. The first type space allocation map represents blocks of allocation units below a predetermined size, and each bit in the first type space allocation map represents the allocation status of a corresponding one of the allocation units at a particular address. The space allocation map of the second type represents blocks of allocation units equal to, or greater than, the predetermined size. The entire second type space allocation map represents the status and size of a single block of allocation units. The space management system also includes a controller unit for interpreting the space allocation map and for executing requests to store information in said allocation units.

21 Claims, 12 Drawing Sheets

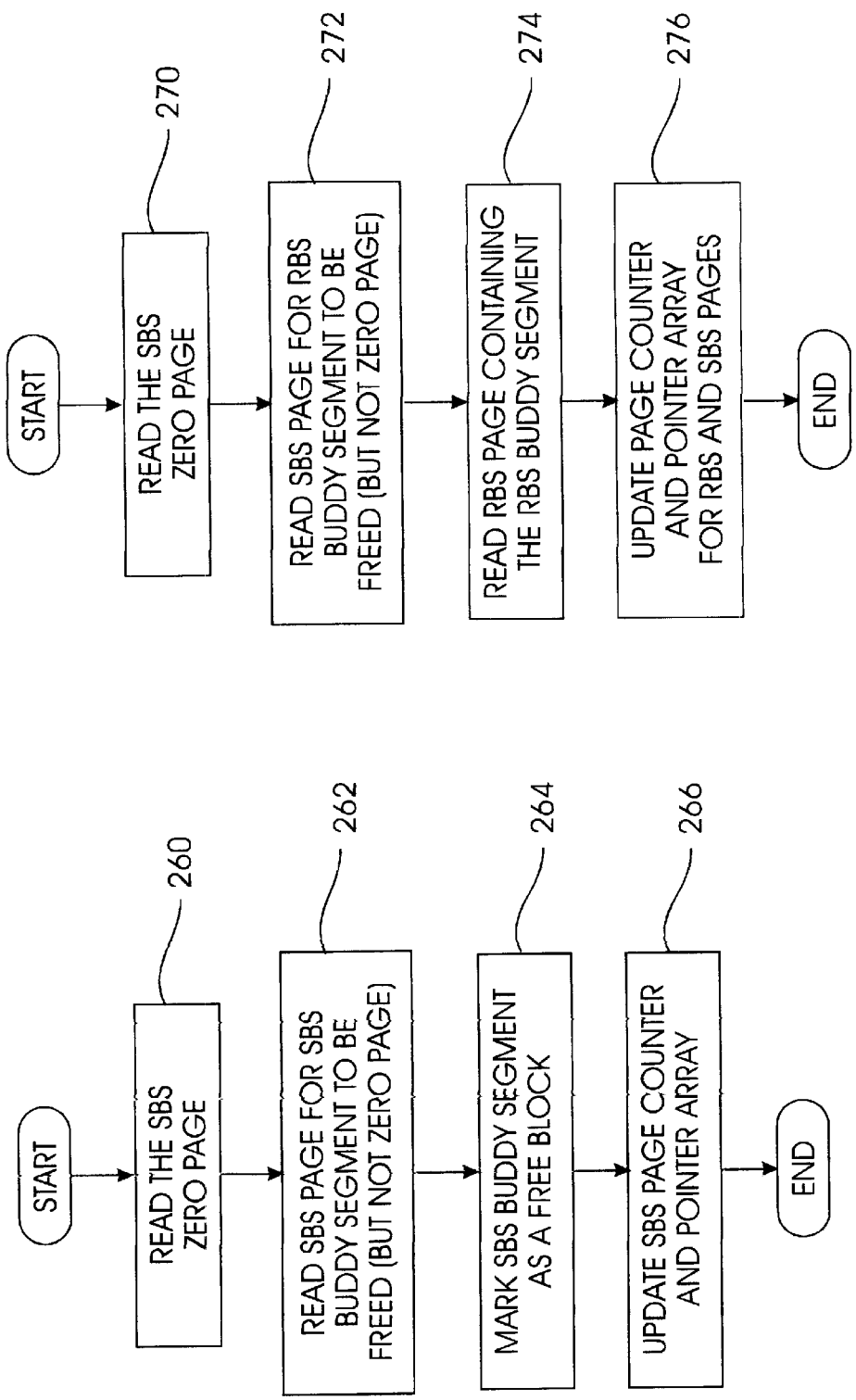

SYSTEM AND METHOD FOR DATA SPACE ALLOCATION USING OPTIMIZED BIT REPRESENTATION

BACKGROUND OF THE INVENTION

1. Field of the Invention

This invention relates generally to space management systems and, more particularly to bit representations of the allocation status of data space in relational database systems.

2. Description of the Related Art

Computer systems have significantly improved in their ability to store and access large quantities of data. Advances in computer data space management systems have made it possible to manipulate increasingly large blocks of data stored in data storage devices.

One computer data space management technique, known as the binary buddy system, is a high performance space management system that can operate on blocks of data of a wide range of sizes, allocating and freeing the blocks with great efficiency. The binary buddy system manages blocks, or memory segments, whose sizes correspond to powers of two. In the binary buddy system, the data space in which data values are contained includes a buddy space that has a size that is a power of two units large. For example, a buddy space might comprise four megabytes (4 MB) of storage locations, which corresponds to $4 \times 1,024,000$ bytes or $2^{12}$ bytes. The entire buddy space is divided into segments (known as buddy segments). In this example, if the buddy space were divided into the largest possible segments there would be two segments, each 2 MB in size. Each of these two buddy segments could be further subdivided into two smaller buddy segments—and so on until a minimal buddy segment size is reached. That is, the buddy space can be comprised of multiple buddy segments, all of different sizes, all being powers of two. The minimal segment size that the system can allocate might be, for example, one kilobyte (1 KB) of data storage locations.

When a request to store a data value of a certain size is received by the binary buddy system, a space allocator of the buddy system allocates a buddy segment for the data value. In attempting to allocate a buddy segment, the space allocator either finds a segment of the correct power-of-two size, or finds a larger segment (starting with up to 4 MB in the above example) and splits it down repeatedly to the desired size. Thus, buddy segments might be allocated in storage blocks of size 1 KB, 2 KB, 4 KB, 8 KB, . . . 512 KB, 1 MB, and so on, up to the buddy space size limit of the computer system in which the database is installed. When a data value is removed from a buddy segment, the space allocator automatically joins that segment with its buddy, if the buddy is free. Similarly, that resulting larger segment is joined with its buddy if the buddy is free—and so on until the maximum possible size segment again is reached.

Implementations of the buddy system space management technique generally have two main components: the space allocation information and the data space itself. The space allocation information includes the status of the buddy spaces with respect to subdivisions into buddy segments and the assignment of the buddy segments to data values. The computer system uses the allocation information to manage the allocation and freeing of storage locations for data values. When used to manage a computer memory space, the space allocation information is represented as a large main-memory data structure. When used to manage large amounts of disk storage, the space allocation information is represented as disk-resident data structures. A binary buddy space management system which overcomes the single disk page limitation is described in U.S. Pat. No. 5,732,402 entitled, "System and Method for Data Space Management Using Buddy system Space Allocation", the entire contents of which are incorporated herein by reference. This patent describes a hierarchical relational database management system which stores and retrieves large data objects (LOBs) from database storage that utilizes a data manager that maintains LOB data space allocation with two types of allocation pages. The first type of allocation page, called a regular buddy space (RBS) page, controls distinct buddy spaces comprising equal-size areas of the LOB data space in which LOB buddy segments are stored. The second type of allocation page, called a super buddy space (SBS) page, controls the RBS pages.

The binary buddy space management system allows much more space to be tracked from a single allocation space because a single SBS page can control numerous RBS allocation pages. For example, in an embodiment disclosed in U.S. Pat. No. 5,732,402, a single SBS page can manage a 64-gigabyte sized data space, thus, only a single disk access is needed to search the 64-gigabyte space and allocate any SBS-size segment. In this way the number of access operations necessary to store LOBs is reduced. Also, the SBS page structure is a compact representation that only requires taco bits of allocation space per minimum disk block size and hence does not take excessive main memory to track very large (terabytes) of disk space. Moreover, the SBS page structure can be integrated with an existing buddy space allocation structure without restructuring the data space.

There are limitations on the efficiency of the above-described space allocation system due to the amount of space required for allocation information. If less space were required for allocation information, more allocation information could be searched per block of allocation data retrieved from disk. As a result, searches could go faster and less memory would be required. Also, the space presently used for allocation could be used for storing other kinds of control information.

From the discussion above, it should be apparent that there is a need for a data space management system that requires less space to store allocation information in order to increase the increase the speed of disk access operations in allocating, storing, and retrieving data values, and also to free up space for use in other control functions.

SUMMARY OF THE INVENTION

In accordance with the invention a space, management system stores and retrieves large data objects (LOBs) from a computer system storage device. The computer system storage device contains a LOB data space having LOB data values. The space management system permits a computer system user to generate requests for access to LOBs of a database and includes a plurality of allocation units for storing data. each having, an address. The allocation units are grouped into a plurality of blocks, each block including at least two allocation units. The space management system includes first and second types of space allocation maps, where each space allocation map has a predetermined number of bits. The first type space allocation map represents blocks of allocation units below a predetermined size. Each bit in the first type space allocation map represents the allocation status of a corresponding one of the allocation units at a particular address. The space allocation map of the second type represents blocks of allocation units equal to, or greater than, the predetermined size. The entire second type space allocation map represents the status and size of a single block of allocation units. The space management system also includes a controller unit for interpreting the space allocation map and for executing requests to store or retrieve information in the allocation units. The use of an efficient space allocation map allows faster data access and frees up space for use in other control functions.

BRIEF DESCRIPTION OF THE DRAWINGS

FIG. 14 is a flow diagram that illustrates the processing steps performed by the data manager illustrated in FIG. 2 in freeing an SBS buddy segment.

FIG. 15 is a flow diagram that illustrates the processing steps performed by the data manager illustrated in FIG. 2 in freeing an RBS buddy segment.

DESCRIPTION OF THE PREFERRED EMBODIMENT

Figure 1:
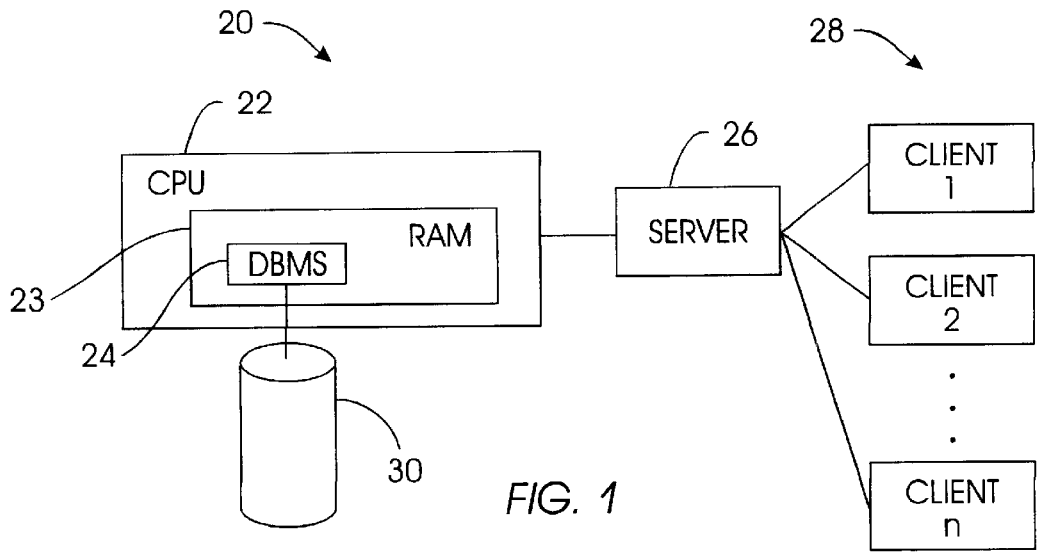
FIG. 1 is a block diagram of a computer system having a relational database management system constructed in accordance with the present invention.

FIG. 1 illustrates a computer processing network system 20 constructed in accordance with the present invention. The system includes a central processor unit (CPU) 22 having random access memory (RAM) 23 in which is resident a relational database management system 24 (DBMS). The CPU 22 is connected to a file server 26, to which many clients 28 can be connected. In FIG. 1, only three clients are shown, for simplicity of illustration. A storage subsystem 30 that is connected to the CPU 22 provides storage locations where data values comprising a relational database are kept. The storage locations are grouped into equal-sized areas called storage pages, or blocks. The DBMS 24 receives database requests from the clients 28 and performs data access operations to store and retrieve referenced data values from the storage subsystem 30. The DBMS supports a large data object (LOB) data type consisting of data values typically greater than 32 kilobytes (KB) in size.

In accordance with the present invention, the DBMS 24 maintains data structures called allocation pages that keep track of data storage availability in the storage subsystem according to a two-tiered system in which one tier of pages, called "regular buddy space" (RBS) pages, are indexed to the pages of the storage subsystem and another tier of pages, called "super buddy space" (SBS) pages, are indexed to the RBS pages. That is, the RBS pages indicate pages of the storage subsystem as being either free or allocated and the SBS pages indicate RBS pages as being either free or allocated. In the illustrated embodiment, for example, an RBS page is four kilobytes (4×1024 bytes, written as 4 KB) in size and controls eight megabytes (8×1,024,000 bytes, written as 8 MB) of data. The CPU 22 can comprise, for example, a large mainframe machine such as the International Business Machines Corporation (IBM Corporation) product called "System/390" or can comprise a workstation such as the IBM Corporation product called "AS/400" or can comprise an "IBM Personal Computer" processor or compatible machine. Typically, the file server 26 is a processor that is at least as powerful computationally as any one of the clients 28. The file server can comprise, for example, a workstation and each of the clients can comprise an "IBM Personal Computer" machine. The storage subsystem 30 can comprise any of a number of conventional direct access storage devices (DASDs) known to those skilled in the art, such as one or more magnetic disk drive systems.

A relational database system such as illustrated in FIG. 1 is a type of database that organizes information for more efficient user manipulation and will be familiar to those skilled in the art. A relational database organizes data values into tables with user-defined interrelationships between the tables. A relational database management system permits users to construct statements that the system will recognize and use to extract, insert, and combine data values from the tables. The selected data values can be assigned to new strings, which comprise table entries, or can replace existing strings. For example, users can use a substring operator in an assignment statement to extract a portion of a character string or video image and assign the extracted portion to a new string (or to replace the existing string) for further manipulation. Users can use a concatenate operator to join two separate strings into a single string, perhaps combining video images or phonetic sounds. Further examples of string operators will occur readily to those skilled in the art.

In addition to being organized into tables of related data values, the data values of the relational database in the illustrated DBMS 24 are stored in accordance with storage units defined by a data device hardware configuration. Typically, the relational database stores a single data value (or table entry) entirely within a single storage unit called a page, which contains one kilobyte (1024) of storage locations. Other page sizes can be used. For example, a page usually includes between 512 bytes and 32768 bytes (32× 1024 bytes, referred to as 32 kilobytes and abbreviated 32 KB). Storing a data value within a single page limits the maximum size of a single data value to the size of the page itself. To provide less restrictive limits on the data values stored, the relational database management system 24 includes a specially defined data type called a long field or large object, generally referred to as a LOB. For example, the database language known as "SQL" permits a user to define LOB data types referred to as BLOB, CLOB, and DBCLOB.

The LOB data values are stored in a file located within one or more disk drives of the storage subsystem 30 comprising a designated area called the LOB data space. A LOB can have a size so large (several gigabytes) that LOBs are stored in subdivided parts called LOB segments according to the binary buddy system. The disconnected LOB segments are kept in the LOB data space in disk storage. A LOB storage/retrieval mechanism of the data manager maintains pointers from one LOB segment to another, thereby keeping all the segments of a single LOB data value together. To store or retrieve all the LOB segments of a LOB from the LOB data space on disk, a series of many disk access operations may be necessary.

Management of the LOB data space, including allocation of space and storage/retrieval of data, is controlled by allocation pages that are kept in a LOB space allocation file. Each allocation page in the LOB space allocation file indicates free space and occupied, or allocated, space in a fixed amount of the LOB data space. The fixed amount of space controlled by an allocation page is generally referred to as a buddy space and can contain many buddy segments. The pages in the space allocation file include a means of indicating free blocks of storage locations within the buddy space and in that way the allocation file controls the storage of data in the buddy space. Control of free storage locations is carried out by setting flags in the allocation pages that indicate whether a space is currently occupied or is free to be used.

Figure 2:
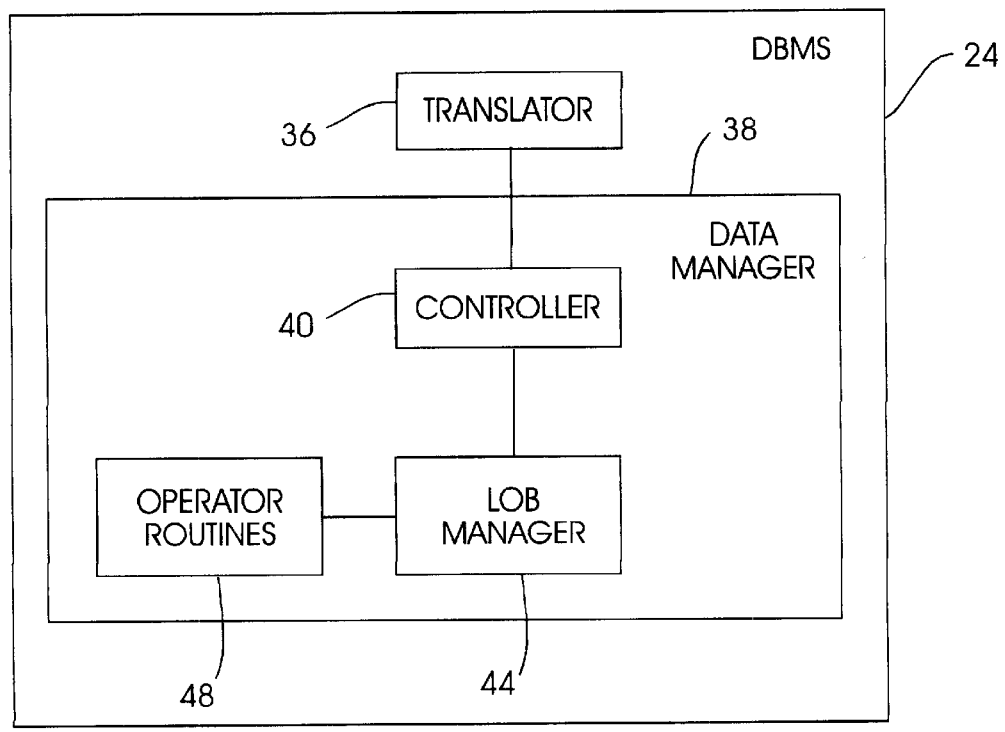
FIG. 2 is a block diagram of the relational database management system illustrated in FIG. 1.

FIG. 2 illustrates the functional blocks of the DBMS 24. FIG. 2 shows that the DBMS includes two primary functional blocks, a translator 36 and a data manager 38. The translator receives database requests from the clients 28 (FIG. 1) in the form of assignment statements according to a database language format (such as the language known as "SQL") and converts them into data structure representations and expressions that are recognizable by the data manager. The translator 36 converts the assignment statements from the clients 28 according to conventional translation schemes, depending on the relational database management system being used. The assignment statements as formulated by the clients, for example, might be in an SQL language format specified by a database management system software product called "DB2" available from IBM Corporation. The translation schemes used by systems such as the "DB2" database management system and the like will be understood by those skilled in the art without further explanation.

The data manager 38 carries out the translated assignment statement operation that was specified by the user. The data manager performs the operations with a controller 40, a LOB manager 44 that handles LOB processing, and a set of operator routines 48 typically comprising string operators and the like. Usually, the assignment statement operations will involve the storage and retrieval of data values from the database storage subsystem 30 (FIG. 1). In that circumstance, it will be necessary for the data manager to allocate sufficient storage blocks in the database storage subsystem or, if a block is no longer needed, it will be necessary for the data manager to free storage blocks so they can be used for subsequent storage operations. It is typically the function of the LOB manager to attend to allocation of storage and the actual requests to the CPU for input/output processing.

Figure 3:
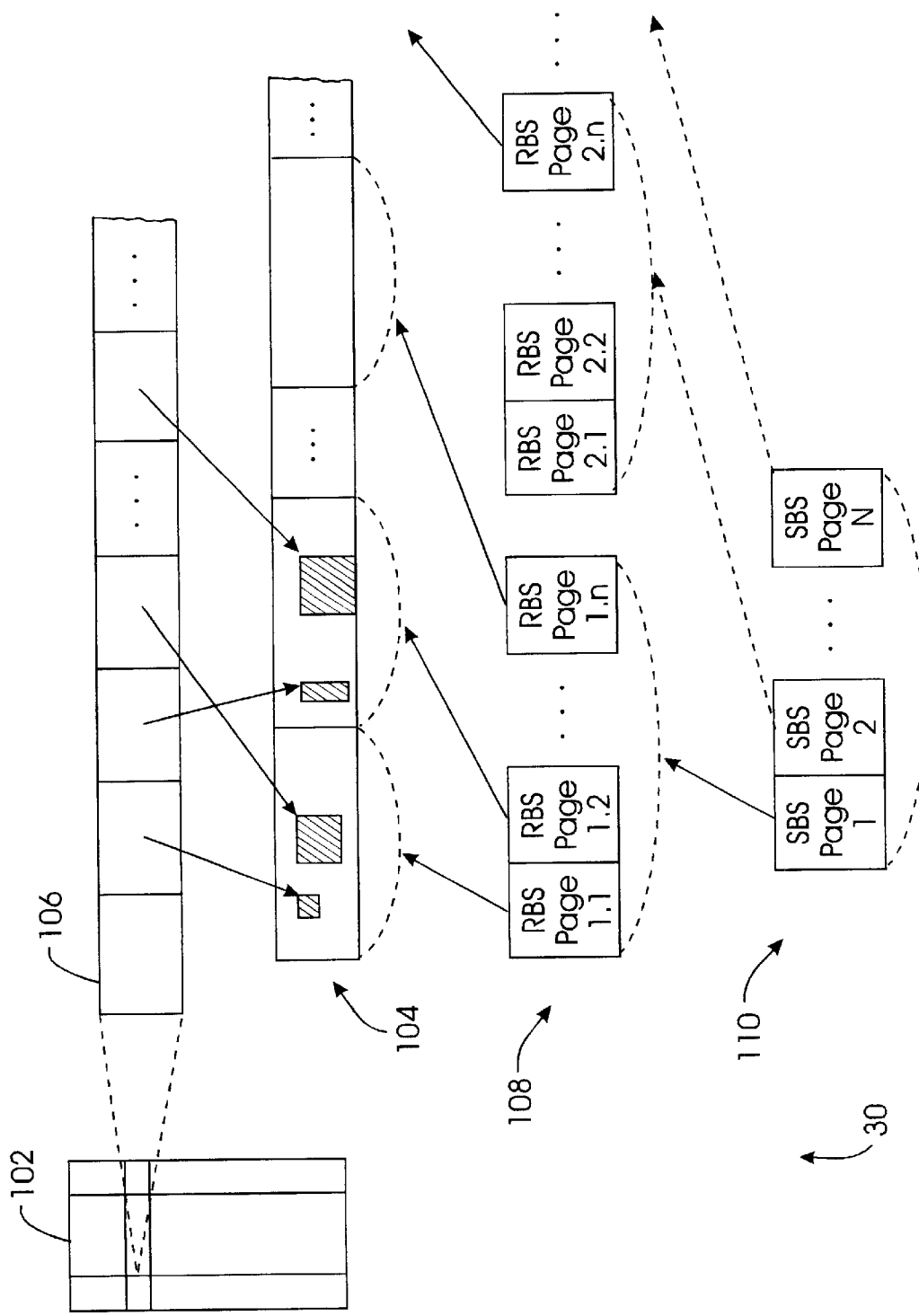
FIG. 3 is a block diagram representation of the data structures maintained by the data manager illustrated in FIG. 2 in allocating space for LOBs.

FIG. 3 illustrates the database space in the storage subsystem 30 (FIG. 1). In the relational database system, the data space includes a plurality of relations defined by data tables, of which one data table 102 is shown in FIG. 3 for purposes of illustration. As known to those skilled in the art, the data table relations are defined by columns of the data table. FIG. 3 illustrates that one entry in a column of the data table can refer to a LOB data structure 104 stored in the database space. FIG. 3 shows that a data structure called a LOB descriptor 106 is associated with the LOB and includes various control fields described further below. FIG. 3 shows that the various control fields of the LOB descriptor point to the LOB.

FIG. 3 also illustrates the LOB allocation file RBS pages 108, which point to the LOB spaces, and the LOB allocation file SBS pages 110, which point to the RBS pages above them and control the RBS pages. The RBS allocation pages 108 and SBS allocation pages 110 are illustrated in a tiered arrangement in FIG. 3 to best reflect their functional relationships, however, in the preferred embodiment, the RBS pages and SBS pages are arranged serially in the database space, as described further below. It also should be understood that, if desired, the RBS pages and SBS pages may be kept separately from the LOB data space. The LOB descriptor 106 preferably is of the minimum size necessary to perform its function of defining a LOB in the database. In the preferred embodiment, the LOB descriptor comprises a single value that defines a large data object that may be stored in the data space in non-contiguous blocks of memory.

Figure 4:
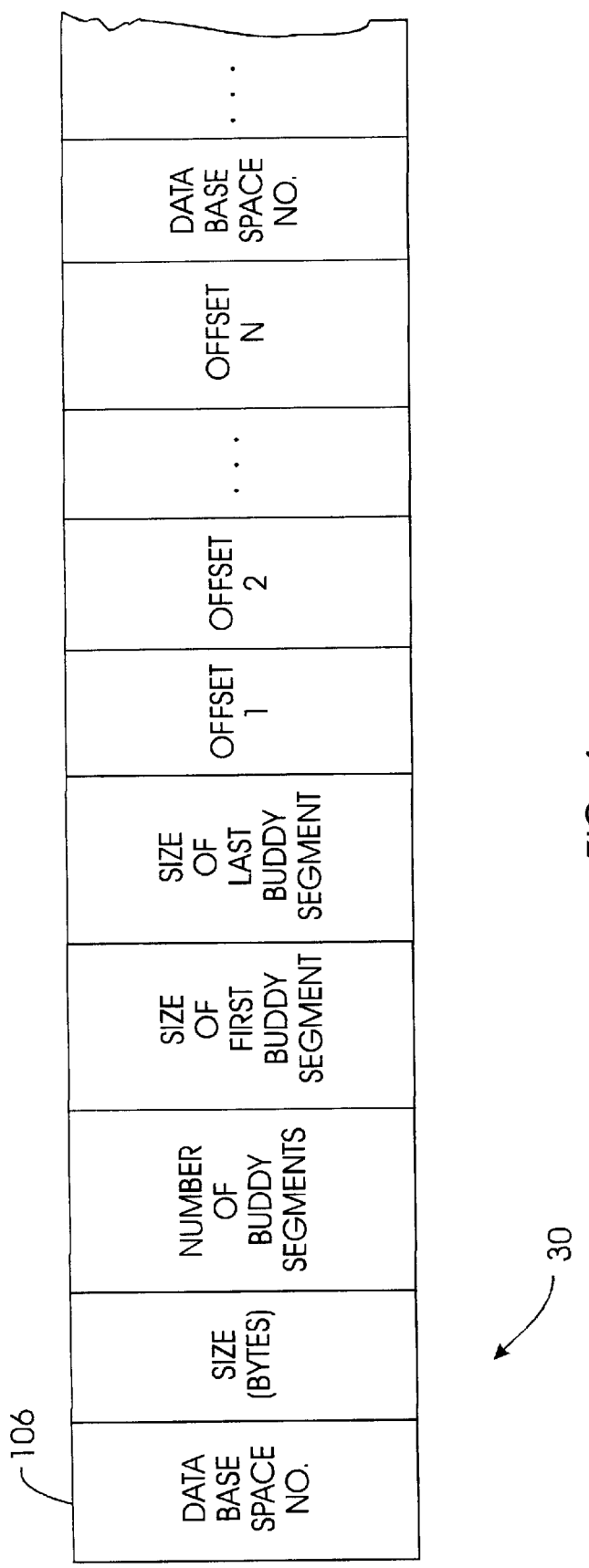
FIG. 4 is a representation of the LOB descriptor data structure illustrated in FIG. 3.

FIG. 4 shows details of the LOB descriptor 106 data structure in the preferred embodiment. The first field of the LOB descriptor is a data space number that identifies a data space of the storage subsystem in which the LOB is stored. It should be understood that the database may contain multiple data spaces for the storage of data values. The next field in the LOB descriptor provides the size of the LOB in bytes. The next field is the number of buddy segments in the LOB. The next two fields indicate the size of the first buddy segment and the size of the last buddy segment. respectively. Because the data manager allocates buddy segments in a binary fashion, the size of all the intervening buddy segments is known from specifying the first and last buddy segment sizes. The remainder of the LOB descriptor comprises a sequence of offset numbers that act as pointers to the buddy segment memory blocks of the LOB.

Figure 5:
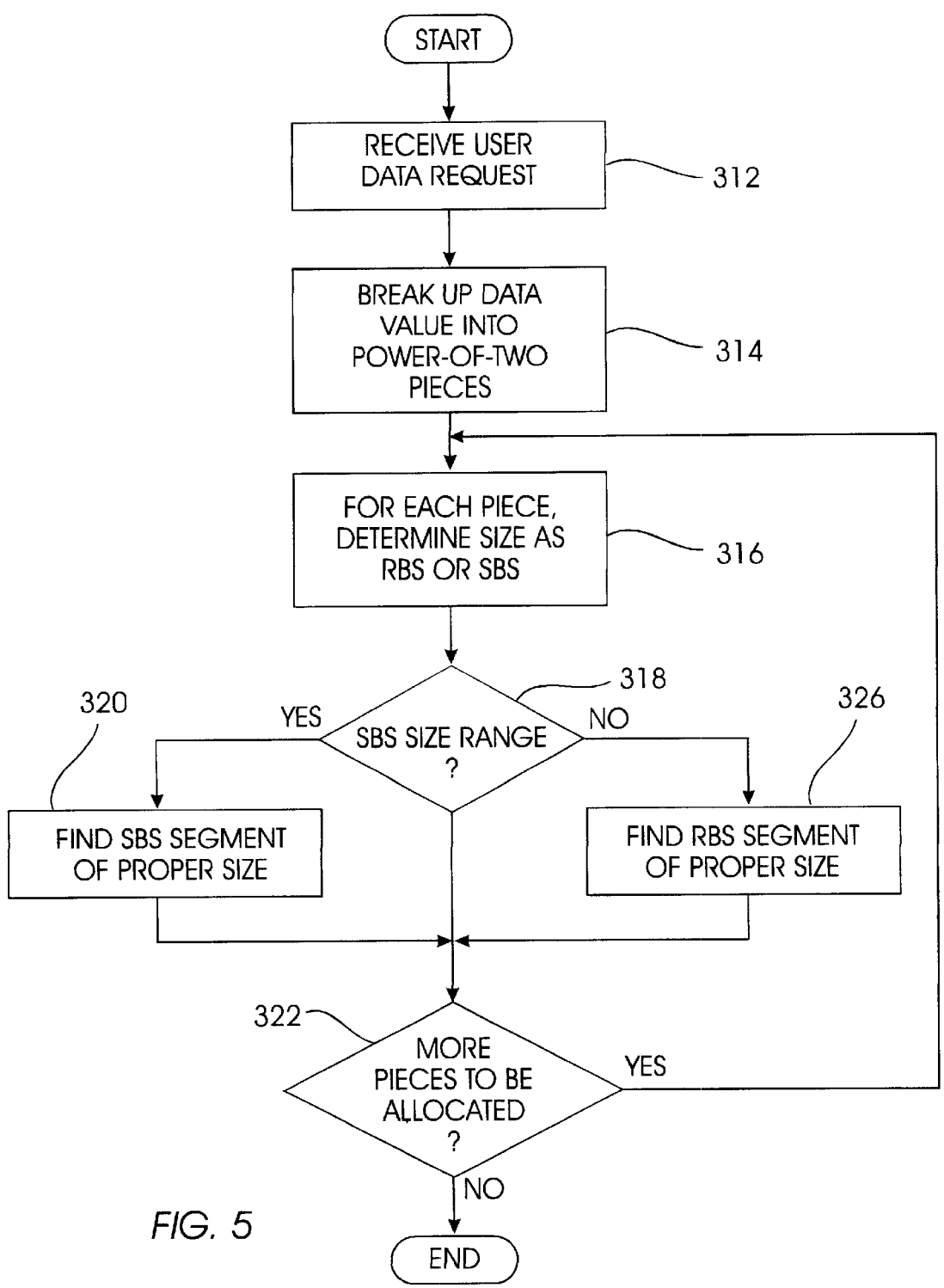
FIG. 5 is a flow diagram that illustrates the processing steps performed by the data manager illustrated in FIG. 2 in responding to user requests for data space allocation.

The data manager illustrated in FIG. 2 responds to user requests for access to LOB data values, such as for storing data values, by searching for free blocks of storage locations. The processing of the data manager in responding to such requests will be better understood with reference to the flow diagram of FIG. 5. After the data manager receives a user data request that calls for storing a LOB data value, as represented by the flow diagram box numbered 312, the data manager identifies the configuration of space needed for storage of the LOB. The data manager does this by breaking the data value up into power-of-two-sized blocks of data space and allocating data spaces accordingly. This step is represented in FIG. 5 by the flow diagram box numbered 314. For example, if the data manager receives an allocation request for a 67 MB data value, this step results in the data manager determining that it must look for data spaces of 64 MB, 2 MB, and 1 MB in size for storing the data value. Those skilled in the art will readily appreciate the steps performed by the data manager in determining the breakdown of data space sizes without further explanation.

Next, as represented by the flow diagram box. numbered 316, the data manager determines a size range of data space required for each of the power-of-two pieces identified in the previous step. In the preferred embodiment, the power-of-two pieces are designated as being in an RBS range if the space needed is a space in the series 1 KB, 2 KB, 4 KB, . . . 512 KB, 1 MB, 2 MB, 4 MB. Similarly, the power-of-two pieces are designated as being in an SBS range if the space needed is in the series 8 MB, 16 MB, 32 MB, 64 MB. In the preferred embodiment, space is not allocated in single blocks of larger size than 64 MB, but it should be apparent that SBS blocks of up to 64 GB in size can be managed in the SBS range by the data manager.

The decision box numbered 318 in FIG. 5 indicates that the data manager follows a different path of processing depending on whether the power-of-two piece to be allocated is in the RBS range or the SBS range. If the piece is in the SBS range, an affirmative outcome at the decision box 318, then the data manager finds an SBS segment (comprising one or more RBS-sized pages of space) by locating either an SBS segment of the correct size, splitting a larger SBS segment down until the data manager has a correct-sized SBS segment, or allocating a new SBS page and (if needed) splitting it to the correct size. These steps are described in greater detail below in connection with FIG. 11.

After the power-of-two piece has been allocated, the data manager determines if any further power-of-two pieces remain to be allocated, as represented by the decision box numbered 322. If more remain, an affirmative outcome, then the data manager processing returns to the flow diagram box numbered 316 to identify whether the next power-of-two piece is in the SBS range or the RBS range. If the last power-of-two piece has been allocated, a negative outcome at the decision box 322, then the data manager processing for allocating this LOB is done and processing ends.

When the data manager determines that a power-of-two piece is in the RBS range, a negative outcome at the decision box numbered 318, then at the flow diagram box numbered 326 the data manager finds an RBS segment in the 1 KB to 4 MB range by locating either an existing divided SBS segment having RBS pages such that a block of RBS pages of the correct size can be located, locating an existing SBS page that can be split into a minimal SBS segment (comprising a single RBS page of 8 MB that can be further split), or by allocating a new SBS segment and splitting it down until the data manager has a correct-sized RBS segment. These steps are described in greater detail below in connection with FIG. 12. As before, the data manager then determines at the decision box numbered 322 if any further power-of-two pieces remain to be allocated and, if more remain, returns to the flow diagram box numbered 316 to identify whether the next power-of-two piece is in the SBS range or the RBS range. If the last power-of-two piece has been allocated, then the data manager processing for allocating this LOB is done and processing ends.

Figure 6:
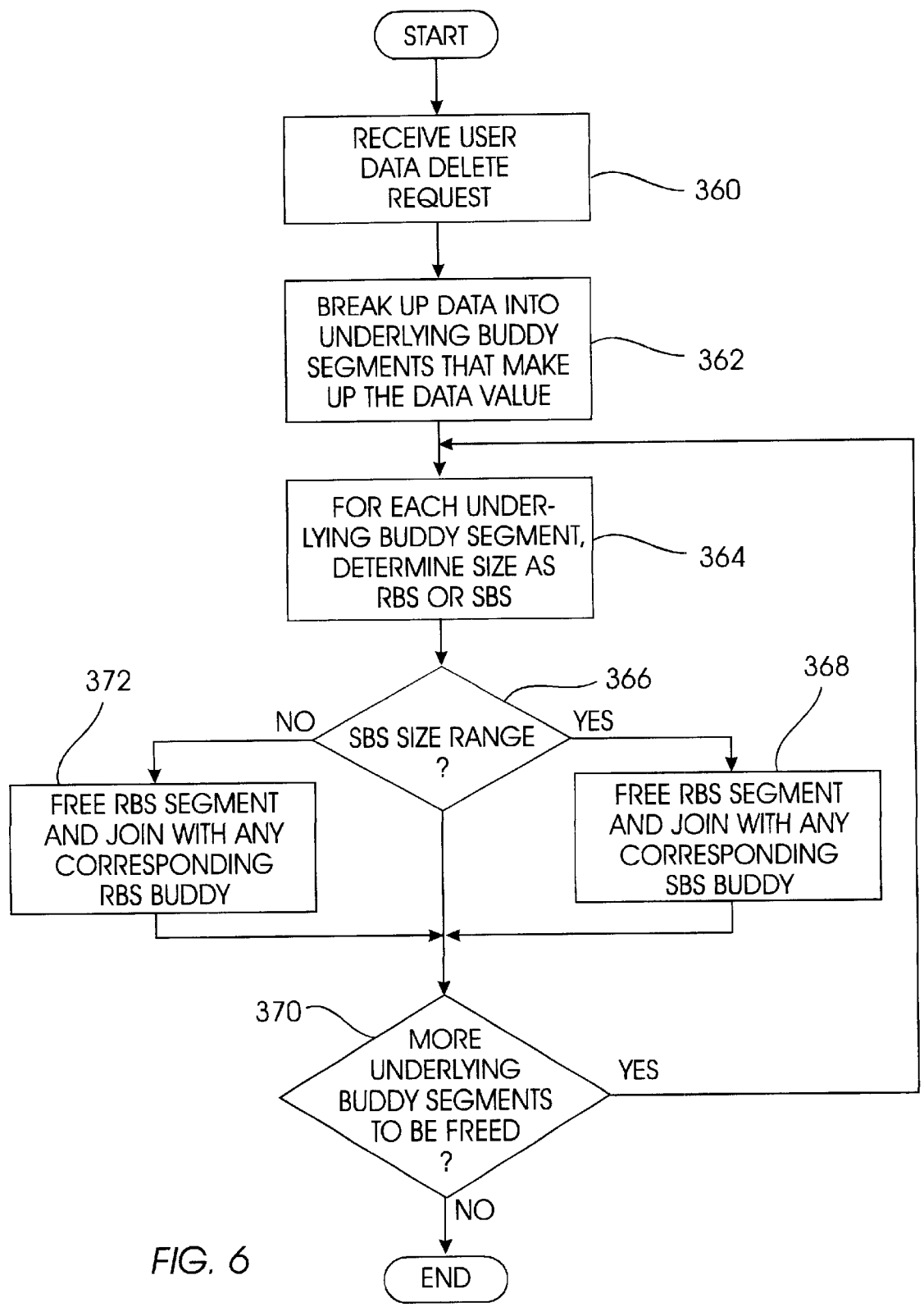
FIG. 6 is a flow diagram that illustrates the processing steps performed by the data manager illustrated in FIG. 2 in responding to user requests for freeing data space.

FIG. 6 illustrates the processing followed by the data manager for freeing a block of data space, such as in response to a user request to delete a LOB. After the data manager receives a user request that calls for freeing a LOB data value, as represented by the FIG. 6 flow diagram box numbered 360, the data manager breaks up the LOB into the underlying buddy segments that make up the LOB. The step of breaking up the LOB is represented by the flow diagram box numbered 362. For example, if a LOB of size 67 MB is to be deleted, then the data manager identifies the underlying buddy segments to have respective sizes of 64 MB, 2 MB, and 1 MB. At the flow diagram box numbered 364, the data manager identifies, for each underlying buddy segment, whether the segment is in the RBS range or the SBS range, as defined above in connection with the allocation processing.

Next, as represented by the decision. box numbered 366, the data manager follows a different path of processing depending on whether the underlying buddy segment to be freed is in the RBS range or the SBS range, as defined above. If the underlying segment is in the SBS range, an affirmative outcome at the decision box 366 then at the flow diagram box numbered 368 the data manager examines the corresponding allocation page for the SBS segment and determines if the buddy of the freed segment also is free. If the buddy is free, then the data manager changes the allocation page to join up the two freed segments into one larger free segment. The data manager continues this process of joining free blocks until it can free the maximum SBS-size block (in the preferred embodiment, a maximum 64 GB block can be accommodated). At that point, an entire SBS page has been freed and the joining up steps for that underlying segment are completed. These steps are described in greater detail below in connection with FIG. 13.

At the FIG. 6 decision box numbered 370. the data manager determines if more underlying buddy segments remain to be freed. If more remain, an affirmative outcome, then data manager processing returns to the decision box numbered 364 to identify the size range of the next underlying buddy segment. If the last underlying segment was freed, so that no more underlying buddy segments remain (a negative outcome at box 370), then the data manager steps for freeing this LOB are completed and such processing ends.

Back at the decision box numbered 366, if the data manager determines that the next underlying buddy segment is in the RBS range, a negative outcome at the decision box, then at the flow diagram box numbered 372 the data manager examines the corresponding RBS allocation page for the RBS segment and determines if the buddy of the freed segment also is free. If the buddy is free, then the data manager changes the allocation page to join up the two freed RBS segments into one larger free segment. The data manager continues this process of joining free blocks until it can free two 4-MB buddy segments of the same RBS page. At that point, an entire SBS segment has been freed and the free RBS pages are "turned into" a free SBS segment. That is. the information in the corresponding SBS allocation page is changed to reflect the free status of the segment. These steps are described in greater detail below in connection with FIG. 14. Once again, at the decision box numbered 370 the data manager then determines if more underlying buddy segments remain to be freed and proceeds accordingly.

Figure 7:
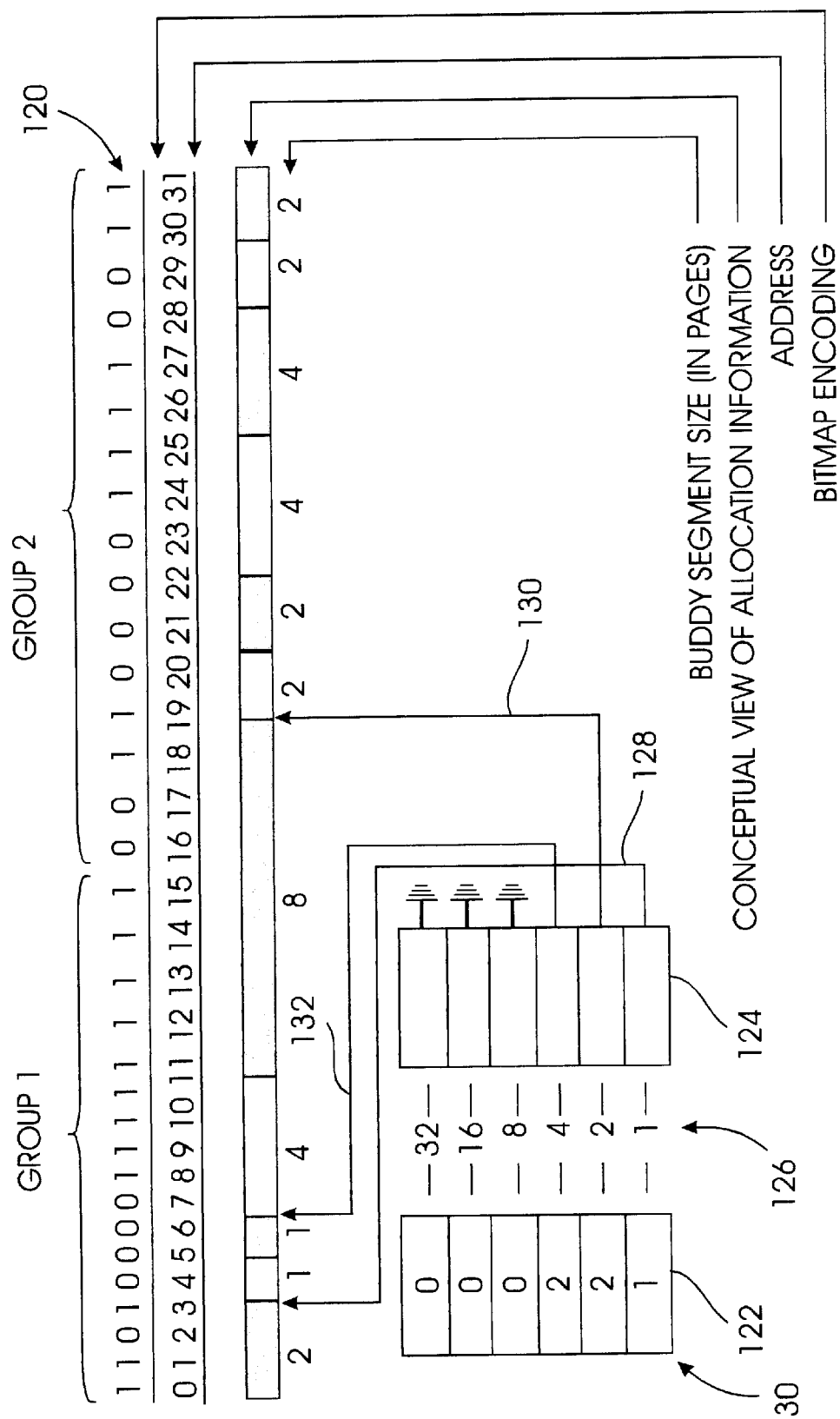
FIG. 7 is a representation of a portion of the allocation page data structure illustrated in FIG. 3.

As noted above, a two-tiered system of allocation pages is used to control the allocation of storage locations in the LOB data space in which the RBS pages control the buddy segment pages of the data space and the SBS pages control the RBS pages. Each allocation page has three parts, comprising an allocation bit map, a count array, and a pointer array. These data structures are illustrated in FIG. 7. The values of the allocation bitmap 120 are shown in FIG. 7 with a corresponding diagrammatic representation, which indicates allocated blocks of storage locations with dark bands and indicates available blocks with light bands. The bitmap is ordered according to storage location address. For an RBS page, the allocated blocks of storage and free blocks of storage correspond to allocated and free blocks of buddy segments, respectively. For an SBS page, the allocated blocks of storage and free blocks correspond to allocated and free RBS pages. For example, in the preferred embodiment, each RBS page controls storage equal to 8192 storage pages (8192=8×1024, also referred to as 8K), each of which contains 1024 bytes (1 KB) of storage locations.

Thus, each RBS page controls a block of storage locations equal to (8K)×(1 KB) of storage, or 8 MB of storage. It should be apparent that a different data page size will provide a different block size over which an RBS page has control. In an analogous manner, each SBS page controls 8,192 RBS pages (and, indirectly, their associated disk memory locations). Thus, each SBS page controls a block of storage locations equal to (8K pages)×(8 MB of memory storage), or 64 gigabytes (64 GB) of storage. In the preferred embodiment, the system includes 64 SBS pages. so that the total storage area controlled has a size of (64)×(64 GB), or 4 terabytes. In this way, a single SBS allocation page can be used to allocate an entire 64 GB block of storage for a LOB. Moreover, the SBS allocation pages provide a means of checking the storage status (allocated or free) of an entire 64 GB block of storage pages without actually examining each of the RBS pages that control it.

Those skilled in the art will recognize that an allocation page "controls" the allocation of memory blocks in a data space by indicating which blocks are free (available) and which ones have already been allocated, in conjunction with operating processes of the data manager. If an allocation page indicates that a block is allocated, then the data manager will not attempt to use that block of memory to store a data value when a user makes an access request, such as with an assignment statement. If an allocation page indicates that a block is free, then the data manager will go ahead and try to use that block when it needs to find space to store a data value.

FIG. 7 shows that the count array 122 and the pointer array 124 are indexed according to the size of the memory blocks being controlled. In the exemplary illustration of FIG. 7, a portion of the respective arrays is illustrated with a column 126 indicating sizes from one to thirty-two. In terms of an RBS page, the count array shows the number of buddy segments of each size available in the space controlled by the corresponding allocation page. In terms of an SBS page, the count array shows the number of RBS pages of each size that are available. The pointer array 124 shows the first place where an available buddy segment was last observed by any process. updating the allocation page, where the pointer array is viewed in terms of an RBS page. In terms of an SBS page, the pointer array shows the first place where a free page was observed.

Thus, the count array 122 and pointer array 124 permit the data manager to determine immediately if it should look in a given allocation page for a given buddy segment size and provide a place to start looking for a segment of a particular size so the data manager does not have to start each search for an available space from the beginning of the bit map. In this way, the count array and pointer array increase the efficiency of the search for a buddy segment.

In FIG. 7, assuming an RBS page, the count array 122 data structure indicates that there is a single free block of 1 KB in size, two free blocks of 2 KB, and two free blocks of 4 KB. The pointer array 124 data structure includes a first pointer 128 that points to the free 1 KB block, a second pointer 130 that points to the first 2 KB free block, and a third pointer 132 that points to the first 4 KB free block. On some occasions, the pointer array 124 might point to a buddy segment that is available, but on other occasions the pointer array might point to a segment that was recently allocated. Hence, the pointer array actually provides a hint to the location of a free buddy segment, rather than an absolute location of an available buddy segment. Nevertheless, the pointer for a particular buddy size is guaranteed to be at least a correct starting point for a search for that size buddy segment. That is, the search will not skip past any free buddy segments of that size.

As the buddy segments (or RBS pages) are allocated, the count array 122 and the pointer array 124 are updated to indicate the current count of free blocks and point to the location of the newly allocated block, respectively. In this way, a bitmap pointer for a given size buddy segment can be said to move forward. As segments are designated to be available, the count array is updated to indicate the additional free segments and the pointer array is set to point to the segment closest to the beginning of the bitmap. In this way, a bitmap pointer can be said to move backward. Upon initialization of the database system, all of the segment pointers of the pointer array are pointed to the first available buddy segment of each respective size. Those skilled in the art will appreciate how to implement a moving data structure pointer without further explanation.

The bit map 120 provides a representation of the allocation information concerning a particular allocation page. Each allocation page has a corresponding bit map. In the preferred embodiment, the bit map indicates whether a page (within a segment) is allocated or available.

Figure 8:
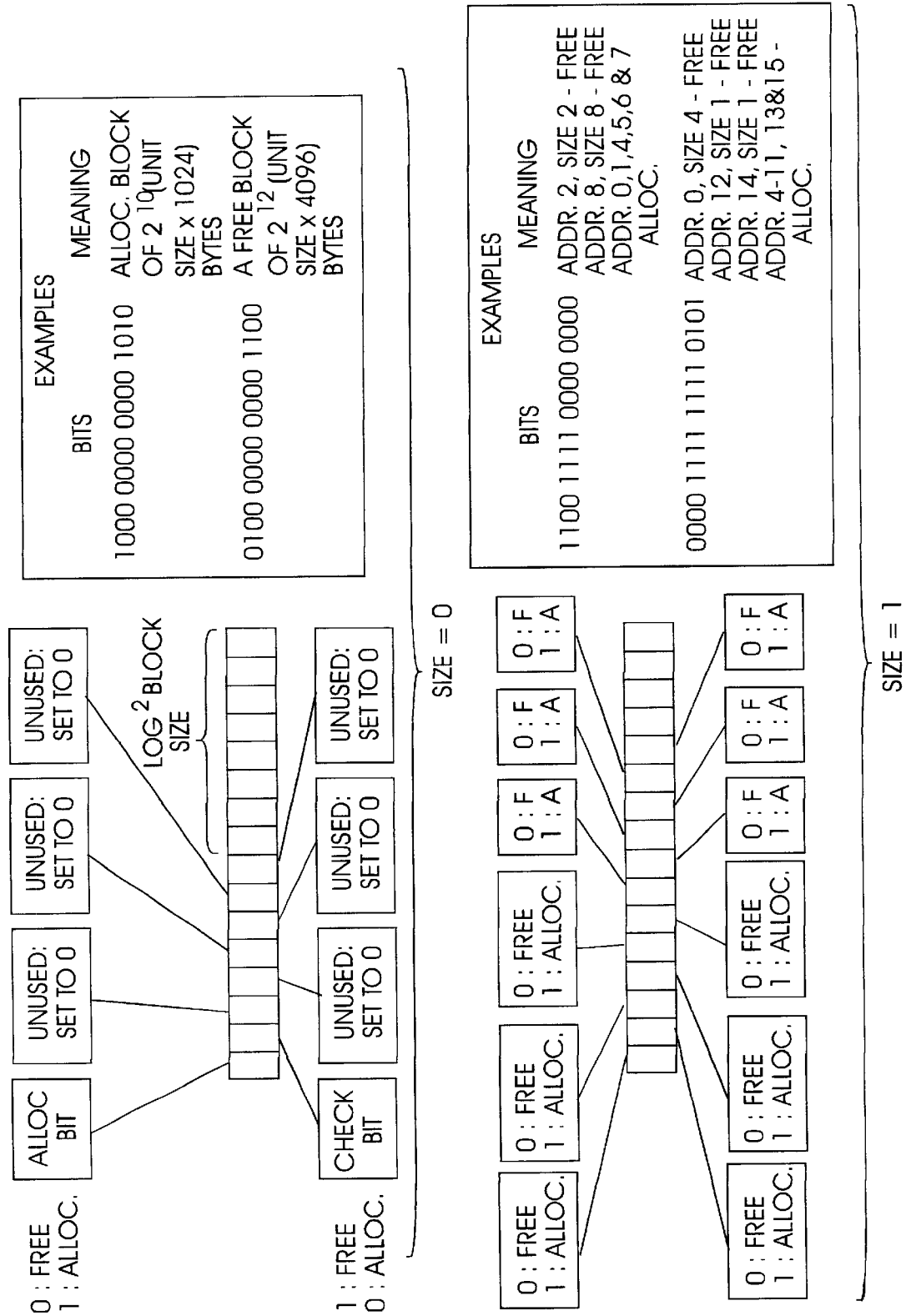
FIG. 8 is a representation of the allocation bitmap-encoding scheme for the allocation page data structure illustrated in FIG. 3.
Figure 9:
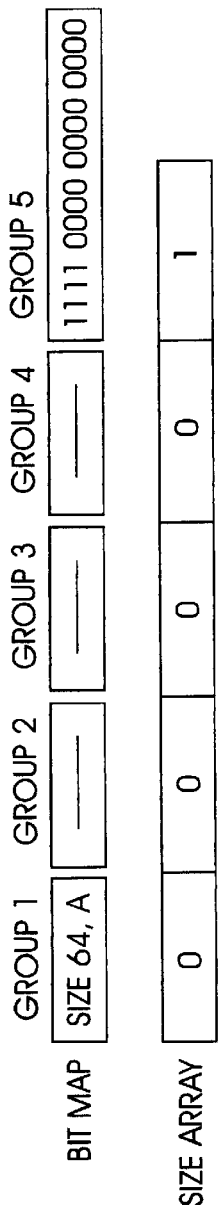
FIG. 9 is a representation of an exemplary allocation array made up of groups of allocation bit maps and a size array in accordance with the invention.

A more detailed illustration of the bit encoding used to store the size and allocation information of various sizes of buddy segments is provided by reference to FIGS. 7–9. More particularly, as illustrated in FIG. 8, for block sized less than 16 times the segment unit size, a first type of bit map is used where only a single bit of allocation information in the bit map is used for each disk page in segments of 4 MB, or less. The first type of bit map is represented by the "size=1" bit map in FIG. 8, where each bit directly shows the status of each individual block. Adjacent "0's" show larger sections of free blocks. Adjacent "1's" show blocks that are busy. The size bit is shared among the 16 status bits, as described below.

The second type of bit map is represented by the "size =0" bit map in FIG. 8. The second type of bit map is used for blocks of 16 or more times the unit size, where the entire group of 16 bits is used for a single block, as described below.

FIG. 9 shows an allocation array that includes 5 groups of bit maps each having 16 bits. Also shown is a size array, which determines whether a block is a first type or second type bit map. The allocation array in FIG. 9 shows that blocks of buddy segments are arranged into base groups. A single "size bit" in the size array is shared among 16 status bits. The address of a block is determined by the bit position in the base group and by the position of the base group in the larger allocation array. In the illustrated embodiment there are 16 bits in a group, each having 16 address locations numbered 0–15.

In FIG. 9 there are four groups having "size =0", which means that they are represented by bit maps of the second type, since the block size is greater than 16 times the unit size. In particular, the allocation array in FIG. 9 shows that there is one allocated block of 64 times the unit size represented by groups numbered 1–4. This is followed by group number 5, which is a first type ("size =1") bit map, as indicated by the size array. Thus, the group 5 bit map shows, at address 64, an allocated block of size 4, (represented by "1111"), followed by a free block of size 4 at address 68 (0000). followed by a free block of size 8 at address 72 (0000 0000).

Thus, for the first type of bit map, where the size bit is set to "size =1", the bits are examined as individual bits, and logical groups inside the 16 bits must be determined by examining adjacent bits. For example, for "size =1", the pattern 1100 1111 0011 0000 shows a free block of size 2 at address 2, a free block of size 2 at address 8, and a free block of size 4 at address 12. The size of a set of free blocks is implicit in the number of free unit blocks—they are never subdivided.

For example, the string "0000" will always represent one free block of size 4, and never two free blocks of size 2 nor four free blocks of size 1.

However, for these first type bit maps, the exact size of the allocated buddy segments cannot be determined. That is, in the above example, 1100 1111 0011 0000, it cannot be determined whether there are two 1K buddy segments, or one 2K buddy segments at address zero. However, this doesn't present a problem because the allocation bit map is never consulted to locate allocated blocks. Hence the size of allocated blocks is not needed by the database management system.

Referring again to FIG. 7, the bit map 120 is a first type bit map that encodes the allocation status as follows: one allocated block of size two (or two allocated single unit blocks) at address zero; one free block at address two; one allocated block at address 3; one free block of size 4 at address 4; one allocated block of size 8 at address 8; one free block of size two at address 16; two allocated blocks at address 18; one free block of size 4 at address 20; four allocated blocks at address 24; one free block of size two at address 28; and two allocated blocks at address 30.

An additional constraint on the first type of allocation bit map is that blocks larger than 1 can start only on an appropriate block address. Thus, a block of size 4 can only start on address 0, 4, 8, 12, . . . An additional constraint is that block sizes can only be powers of 2, as discussed above. Thus, the bit string 1111 1100 0000 0011, represents one allocated block of size 4, one allocated block of size 2, one free block of size 2, one free block of size 4, one free block of size 2, and one allocated block of size two.

Referring again to FIG. 8, the second type of allocation bit map, where "size =0", is used for blocks that are sixteen times the unit size, or larger. In the illustrated embodiment this corresponds to buddy segments that are 16KB or greater. In the second type bit map, the first byte is the status byte for the buddy segment. The first bit is the allocation bit, where a "1" indicates that the block is allocated and a "0" indicates that the block is free. The second bit is a check bit that is set to be the opposite of the status bit as a verification of the allocation status. The third through eighth bits are unused and are set to zero.

In the second type of allocation bit map, the sizes of allocated blocks, as well as free blocks, is known. The size is expressed in log (base2) format using the rightmost byte. For example, for size=0, the pattern: 1000 0000 0000 1010 shows an allocated block of $2^{10} \times 1K = 1$ MB buddy segment at address zero. The pattern 0100 0000 0000 1100 shows a free block of $2^{12} \times 1K = 4$ MB buddy segment at address zero.

As a result of the compact bit map described above more allocation information can be stored in less space than in previous buddy systems. This allows the database management system to perform searches faster and also frees up space that can be used for other control functions.

Those skilled in the art should appreciate how the discussion above concerning the FIG. 7 data structures in terms of an RBS page would relate to the data structures in terms of an SBS page. The SBS page control of RBS pages is directly analogous to the RBS control of memory location pages. The following description of the bitmap encoding is with respect to the RBS pages, but an analogous discussion would apply to the SBS pages in a manner that should be readily apparent.

When the data manager searches the LOB data space for a free segment, if the segment at a current boundary is larger than the desired size, then the data manager continues the search at the end of the current segment. If the segment at the current boundary is smaller than the desired segment size, then the search continues at the next boundary of the desired segment size. For example, the path of a search for a buddy segment of size four is illustrated in FIG. 10 with respect to the bitmap 120, count array data structure 122, and pointer array data structure 124 first illustrated in FIG. 7.

Figure 10:
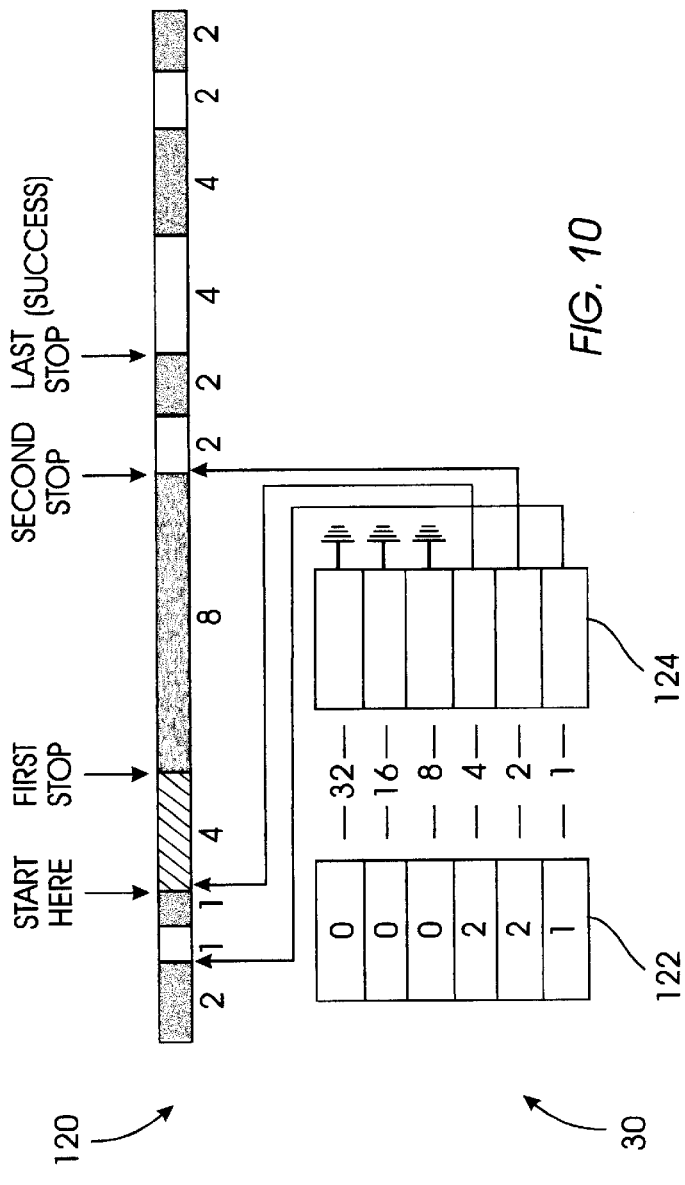
FIG. 10 is a representation of the allocation bitmap data structures illustrated in FIG. 8 during a space allocation processing.

In FIG. 10, a bitmap pointer initially points (at the location marked "Start here") to the allocation bitmap 120 at a segment of size four that was recently allocated. Therefore, the data manager will begin the search for a free block there. Because that segment of size four is allocated, the data manager continues the search at the boundary of the next segment, marked "First stop", where the data manager comes upon a segment of size eight. The current-segment being examined is size eight, which is larger than the desired segment, of size four, so that the data manager continues the search at the end of the current segment. At the end of the current (size eight) segment, the data manager locates a free segment of size two (marked "Second stop"). The current segment size of two is smaller than the desired segment size of four, and therefore the data manager continues its search at the next boundary of the desired segment size (size four), where the search is successful (at the point marked "Last stop").

Figure 11:
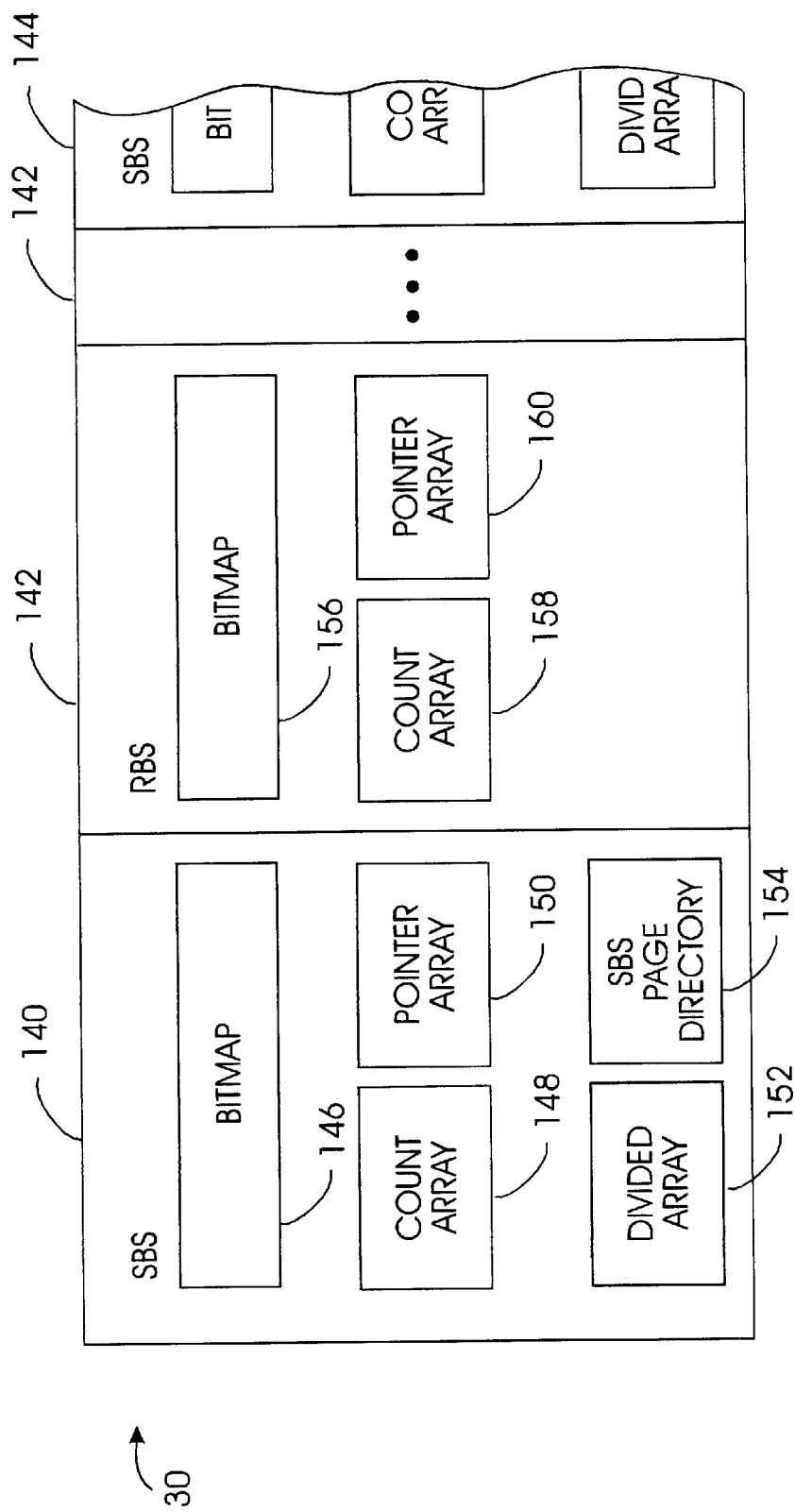
FIG. 11 is a representation of the SBS and RBS allocation pages in their relative locations in the data storage subsystem illustrated in FIG. 1.

FIG. 11 shows an arrangement of the RBS pages and SBS pages in the storage subsystem 30 of FIG. 1 according to the preferred embodiment, wherein an SBS allocation page is followed by the RBS pages that it controls. Thus, a first SBS page 140 is shown followed by a group of RBS pages 142, followed by a second SBS page 144, and so forth. Each SBS page includes a bitmap 146, count array 148, and pointer array 150, as described above, relative to the RBS pages it controls, and also includes a divided array data structure 152 and an SBS page directory 154 data structure, also as described above. It should be understood that each RBS allocation page includes an analogous bitmap 156, count array 158, and pointer array 160, as described above, relative to the data storage pages that it controls.

The SBS allocation pages 140 include a divided array data structure 152 and an SBS page directory data structure 154, which are not found in the RBS allocation pages 144. The divided array data structure 152 indicates a subdivision of SBS pages 140. A minimum SBS unit is an RBS page, which in the illustrated embodiment controls 8 MB of storage space. SBS units are allocated in powers of two according to the binary buddy system and are marked as being either allocated or free, depending on their status. Thus, an SBS buddy segment that is two units in size (16 MB) can have a status of allocated (if it is in use) or free (if it is available). When an SBS buddy segment is one unit however, then there is a possibility that it was further divided into smaller sizes as part of an RBS buddy segment. Therefore, the divided array data structure is used to track which SBS buddy segments have been subdivided into RBS buddy segments. The divided array contains one bit for every SBS unit. When an SBS unit bit of a divided array is turned on, it indicates that the corresponding SBS unit has been subdivided into smaller RBS sizes. The SBS unit otherwise is assumed to be a full SBS size and its status is shown by the SBS allocation bits.

The SBS page directory data structure 154 is an array that contains one entry for each super buddy space in the LOB data space. Only one SBS page directory 154 is needed to cover the entire LOB data space. In particular, the SBS page directory 154 contains a flag for a predetermined number N of the largest buddy segment sizes for each SBS page. In the preferred embodiment, for example, the top sixteen sizes of buddy segments are stored. If there is at least one buddy segment of a particular size available in an SBS page 140, that corresponding flag is set in the SBS page directory 154. The flag otherwise is set to zero. In the preferred embodiment, there are seventeen sizes of buddy segments in binary size increments, ranging from the smallest size of 1 KB to the largest buddy segment size of 64 MB. The representation of the SBS page directory 154 provides convenient use because each entry for a particular SBS page 140 is effectively a logarithm scale. That is, one can easily determine if an SBS page contains the needed space by comparing the log (base 2) of the desired segment size with the SBS page directory entry. If the page directory entry is greater than or equal to the (adjusted) log of the desired buddy segment size, then that SBS page 140 contains at least one free buddy segment of the desired size.

As noted above, only one SBS page directory 154 is needed for the entire LOB data space. The SBS page directory 154 is arbitrarily kept with the first SBS page, which for convenience will be referred to as the "zero page" of the SBS pages. Because the directory contains primarily flags to indicate subdivisions, it can be kept rather compact. Thus, in the preferred embodiment, the SBS page directory occupies approximately 4 KB. For easier data structure definitions. in the preferred embodiment every SBS page 140 includes an area in which the SBS page directory could be maintained. Because only one is needed, however, only the SBS page directory in the SBS zero page is updated and maintained. This aspect of the preferred embodiment is apparent from the representation of the RBS pages 142 and SBS pages 140 in FIG. 11.

Figure 12:
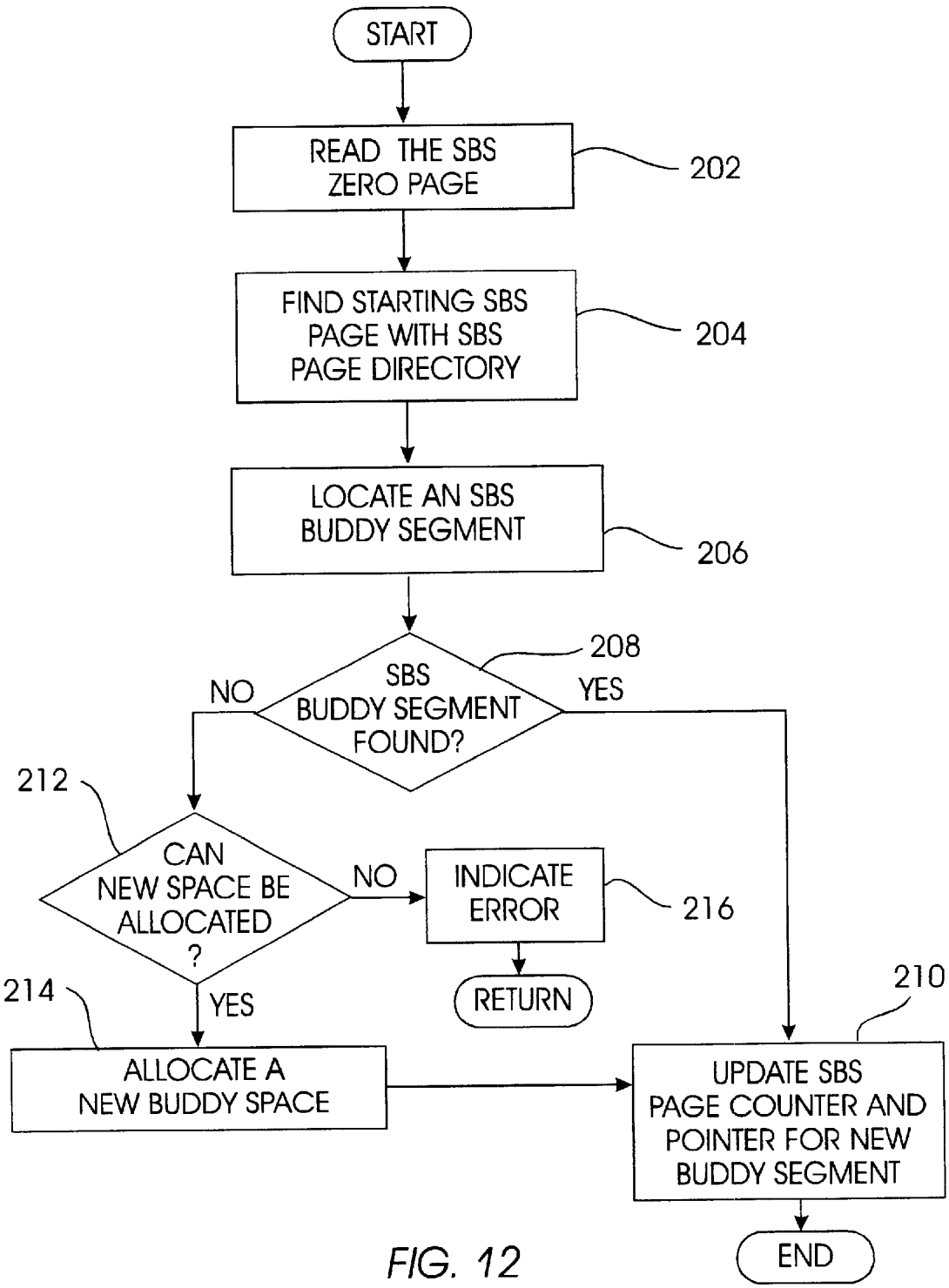
FIG. 12 a flow diagram that illustrates the processing steps performed by the data manager illustrated in FIG. 2 in searching the SBS data structures.

The operation of the data manager in searching the SBS pages 140 and updating the allocation information when allocating blocks will be better understood with reference to the flow diagram of FIG. 12. In the first step, represented by the flow diagram box numbered 202, the data manager reads the SBS zero page. In the next step, corresponding to the flow diagram box numbered 204, the data manager finds the appropriate starting SBS page using the SBS page directory data structure, as described above. Next, the data manager uses a conventional linear page search to locate an SBS buddy segment of the appropriate size, as represented by the flow diagram box numbered 206. At the decision box numbered 208, the data manager determines if a buddy segment was found in the located space. If a space was found, then the data manager proceeds to use the segment for a store operation and, as represented by the flow diagram box numbered 210, updates the SBS page counter and pointer data structures to refer to the new buddy segment. If no SBS buddy segment was found at box 208, then the data manager proceeds to the flow diagram box numbered 212, where it determines if a new space can be allocated. If a new space cannot be allocated, such as when no suitable space is free, the data manager returns an error indication at the flow diagram box numbered 216. If a new space can be allocated, an affirmative outcome at the decision box 212, then the data manager allocates a new buddy space at the flow diagram box numbered 214. The data manager then concludes its operation by updating the SBS page counter and pointer array for the newly allocated buddy segment, as represented by the flow diagram box numbered 210.

Figure 13:
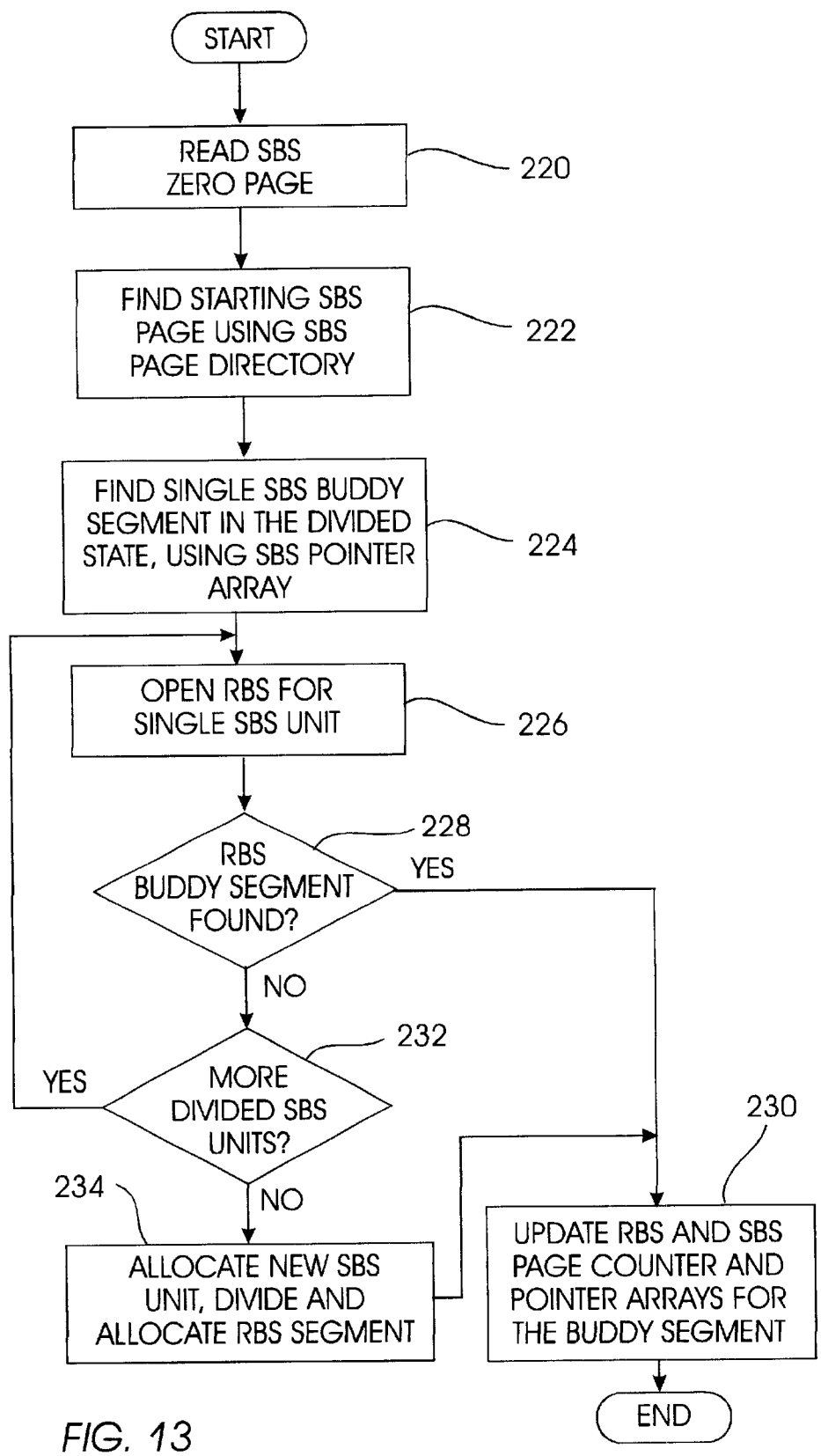
FIG. 13 a flow diagram that illustrates the processing steps performed by the data manager illustrated in FIG. 2 in searching the RBS buddy segment data structures during a space allocation.

The flow diagram of FIG. 13 represents the processing steps followed by the data manager in allocating an RBS buddy segment. In the first step, the data manager reads the SBS zero page, represented by the flow diagram box numbered 220. In the second step, the data manager uses the SBS page directory data structure to find the appropriate starting SBS page, as represented by the flow diagram box numbered 222. The flow diagram box numbered 224 indicates that the data manager next searches the SBS pages for single buddy segments that are in the divided state, using the SBS pointer array data structure to locate a segment of the appropriate size. As before, conventional linear search techniques can be used.

The next processing step, represented by the FIG. 13 flow diagram box numbered 226, is the beginning of a processing loop for locating a proper-sized RBS buddy segment that can be allocated. Thus, at the box numbered 226, the data manager begins by opening the RBS page that corresponds, to the single SBS unit located previously. Those skilled in the art will appreciate that "opening" a page refers to orienting a pointer to a specific area of storage locations in the data storage subsystem. When the data manager opens a page, it can determine the status of the page (allocated or free). At the next processing step after opening, represented by the decision box numbered 228, the data manager uses a conventional linear page search and attempts to locate an available RBS buddy segment. If an RBS buddy segment is located, an affirmative response at the box numbered 228. then the data manager updates both the RBS and SBS counter array and pointer array data structures for the RBS buddy segment, as represented by the flow diagram box numbered 230. Thus ends the allocation processing. If no RBS buddy segment is located at the decision box numbered 228, then at the decision box numbered 232, the data manager determines if additional divided SBS units remain to be opened and checked for free status. If there are additional divided SBS units an affirmative response, then processing returns to the flow diagram box numbered 226 where the next RBS page is opened. If there is a negative response at the decision box numbered 232, meaning that there are no additional divided SBS units, then the data manager has completed its loop through the SBS units without finding an available RBS buddy segment.

Because the loop was completed without locating an available RBS buddy segment, the data manager next allocates a new SBS unit and also divides and allocates an RBS buddy segment. This step is represented in FIG. 13 by the flow diagram box numbered 234. After the allocation, the data manager completes the allocation processing by updating the RBS and SBS page counter and pointer array data structures for the newly allocated RBS buddy segment, as represented by the flow diagram box numbered 230.

FIG. 14 is a flow diagram that represents the processing steps followed by the data manager in freeing an SBS buddy segment. In the first processing step, represented by the flow diagram box numbered 260, the data manager reads the SBS zero page. In the next processing step, the data manager reads the SBS page corresponding to the SBS buddy segment to be freed (flow diagram box numbered 262). It should be apparent that the SBS page read by the data manager would be a page other than the zero page, which was already read in the previous processing step. The next step, represented by the flow diagram box numbered 264, is for the data manager to mark the SBS buddy segment as having a free status. Finally, in the flow diagram box numbered 266, the data manager updates the SBS page counter and pointer array data structures.

The processing of the data manager in freeing an RBS buddy segment will be better understood with reference to the flow diagram box of FIG. 15. In the first processing step, represented by the flow diagram box numbered 270, the data manager reads the SBS zero page. In the next step, represented by the flow diagram box numbered 272, the data manager reads the SBS page corresponding to the RBS buddy segment to be freed. As with the SBS page processing of FIG. 14, it should be apparent that the SBS page read by the data manager during the processing of FIG. 15 will be a page other than the zero page, which was already read in the previous processing step. Next, the data manager reads the RBS page containing the RBS buddy segment identified previously (flow diagram box numbered 274). Finally, at the flow diagram box numbered 276, the data manager updates the pointer and counter arrays on both the RBS and SBS pages.

The data manager described above in connection with a presently preferred embodiment of the invention uses a two-tiered allocation page configuration to manage a data space of up to four terabytes. It should be apparent that the principles of this invention could be used with even greater multiple-tiered configurations to manage still larger data spaces of extremely large size containing LOBs of similarly large size.

The preferred embodiment of the invention has been primarily disclosed as a computer system and method of operation thereof. In particular, it will be understood by persons of ordinary skill in the art that the computer system described above includes appropriate components (including program storage, input/output facilities, a connecting bus, and the like) and that the computer system could be programmed or otherwise designed to facilitate the practice of the method of the invention. Such a computer system would include appropriate program means for executing the method of the invention. Also, an article of manufacture, such as a pre-recorded floppy disk or other similar computer program product for use with such computer systems, could include a storage medium and program means recorded thereon (readable by an appropriate component of the computer system) for directing the computer system to facilitate the practice of the method of the invention. It will be understood that such apparatus and articles of manufacture also fall within the spirit and scope of the invention.

The present invention has been described above. in terms of a presently preferred embodiment so that an understanding of the present invention can be conveyed. There are, however, many configurations for relational database management systems not specifically described herein but with which the present invention is applicable. The present invention should therefore not be seen as limited to the particular embodiment described herein, but rather, it should be understood that the present invention has wide applicability with respect to space management systems generally. All modifications, variations, or equivalent arrangements that are within the scope of the attached claims should therefore be considered to be within the scope of the invention.

I claim:

1. A space management system comprising:
    a plurality of allocation units for storing data, each allocation unit having an address, the allocation units being grouped into a plurality of blocks, each block including at least two allocation units;
    first and second types of space allocation maps, each space allocation map having a predetermined number of bits, said first type space allocation map representing blocks of allocation units below a predetermined size, wherein one and only one bit in the first type space allocation map represents the allocation status of a corresponding one of the allocation units at a particular address;
    said space allocation map of the second type representing blocks of allocation units equal to, or greater than, the predetermined size, wherein the entire second type space allocation map represents the status and size of a single block of allocation units; and
    a controller unit for interpreting the first and second types of space allocation maps, the controller unit including means for executing requests to store information in said blocks of allocation units.

2. A space management system according to claim 1, wherein for space allocation maps of the first type, the number of consecutive bits in a group of bits indicating the allocation status of free allocation units represents the number of contiguous free allocation units in a block of allocation units.

3. A space management system according to claim 1 wherein the bits in the first and second types of allocation maps include a binary representation of whether a block of allocation units contain data or not.

4. A space management system according to claim 1 further comprising a size bit map indicating whether a particular allocation map is a first or a second type space allocation map.

5. A space management system according to claim 1 wherein space allocation maps of the first type include bits that are a binary logarithmic representation of the size of a block of allocation units.

6. A space management system according to claim 1, wherein the controller unit further comprises means for executing requests for emptying allocation units of data and means for restructuring blocks of allocation units thereby emptied.

7. A space management system according to claim 1, wherein the number of allocation units in each block is a power of two.

8. A space management system according to claim 1 wherein the number of bits in the first type space allocation map is equal to the number of bits in the second type space allocation map.

9. A space management system according to claim 1 wherein the allocation units store large data objects (LOBs).

10. A space management system according to claim 9 wherein some of the blocks of allocation units are at least 64 GB in size.

11. A space management system according to claim 1 further comprising a plurality of regular-tier allocation page data structures that include the first and second type space allocation maps, the regular-tier allocation page data structures indicating, for a predetermined number of LOB data space storage locations comprising a regular-tier buddy space, whether the storage locations are free or allocated.

12. A space management system according to claim 11 further comprising a plurality of super-tier allocation page data structures that include the first and second type space allocation maps, the super-tier allocation page data structures indicating, for a predetermined number of regular-tier pages comprising a super-tier buddy space, whether the regular-tier pages are free or allocated.

13. A method of managing the allocation of data values in the data space of a database having a plurality of allocation units for storing data, each allocation unit having an address, the allocation units being grouped into a plurality of blocks, each block including at least two allocation units, the method comprising the steps of:

receiving a user request for access to the data space for storage of data values;

providing first and second types of space allocation maps, each space allocation map having a predetermined number of bits, said first type space allocation map representing blocks of allocation units below a predetermined size, wherein one and only one bit in the first type space allocation map represents the allocation status of a corresponding one of the allocation units at a particular address, said space allocation map of the second type representing blocks of allocation units equal to, or greater than, the predetermined size, wherein the entire second type space allocation map represents the status and size of a single block of allocation units;

examining each bit in the first type space allocation map to determine the allocation status of at least one allocation unit at each allocation unit address to identify a block of free allocation units;

allocating the identified block of free allocation units for storage of data values if it is an appropriate size; and updating the allocation map to indicate the identified block of allocation units as being allocated.

14. A method according to claim 13, further comprising executing requests for emptying allocation units of data and restructuring blocks of allocation units thereby emptied.

15. A method according to claim 13, further comprising examining a plurality of regular-tier allocation page data structures that include the space allocation map, the regular-tier allocation page data structures indicating, for a predetermined number of LOB data space storage locations comprising a regular-tier buddy space, whether the storage locations are free or allocated.

16. A method according to claim 15, further comprising examining a plurality of super-tier allocation page data structures that include the space allocation map, the super-tier allocation page data structures indicating, for a predetermined number of regular-tier pages comprising a super-tier buddy space, whether the regular-tier pages are free or allocated.

17. A program storage device readable by a processor machine, tangibly embodying a program of instructions executable by the processor machine to perform method steps for managing storage allocation for storage of data values in a relational database having a plurality of allocation units for storing data, each allocation unit having an address, the allocation units being grouped into a plurality of blocks, each block including at least two allocation units, the method steps performed by the processor machine comprising the steps of:

receiving a user request for access to the data space for storage of data values;

providing first and second types of space allocation maps, each space allocation map having a predetermined number of bits, said first type space allocation map representing blocks of allocation units below a predetermined size, wherein one and only one bit in the first type space allocation map represents the allocation status of a corresponding one of the allocation units at a particular address, said space allocation map of the second type representing blocks of allocation units equal to, or greater than, the predetermined size, wherein the entire second type space allocation map represents the status and size of a single block of allocation units;

examining each bit in the first type space allocation map to determine the allocation status of at least one allocation unit at each allocation unit address to identify a block of free allocation units;

allocating the identified block of free allocation units for storage of data values if it is an appropriate size; and updating the allocation map to indicate the identified storage locations as being allocated.

18. A method according to claim 17 further comprising executing requests for emptying allocation units of data and restructuring blocks of allocation units thereby emptied.

19. A method according to claim 17, further comprising examining a plurality of regular-tier allocation page data structures that include the space allocation map, the regular-tier allocation data structures indicating, for a predetermined number of LOB data space storage locations comprising a regular-tier buddy space, whether the storage locations are free or allocated.

20. A method according to claim 19, further comprising examining a plurality of super-tier allocation page data structures that include the space allocation map, the super-tier allocation page data structures indicating, for a predetermined number of regular-tier pages comprising a super-tier buddy space, whether the regular-tier pages are free or allocated.

21. A computer system comprising:

a central processor unit;

a memory unit;

at least one storage device for the storage of data values of a data type corresponding to large data objects (LOBs), the storage device containing a LOB data space having LOB data values of a database;

a space management system that permits a computer system user to generate requests for access to LOBs of a database, the system including:

a plurality of allocation units for storing data, each having an address, the allocation units being grouped into a plurality of blocks, each block including at least two allocation units;

first and second types of space allocation maps, each space allocation map having a predetermined number of bits, said first type space allocation map representing blocks of allocation units below a predetermined size, wherein one and only one bit in the first type space allocation map represents the allocation status of a corresponding one of the allocation units at a particular address;

said space allocation map of the second type representing blocks of allocation units equal to, or greater than, the predetermined size, wherein the entire second type space allocation map represents the status and size of a single block of allocation units; and a controller unit for interpreting the space allocation map, the controller unit including means for executing requests to store information in said allocation units.

* * * * *